United States Patent [19]
Kusan

[11] 3,851,112
[45] Nov. 26, 1974

[54] DATA DETECTOR WITH VOICE SIGNAL DISCRIMINATION

[75] Inventor: Lawrence J. Kusan, Glendale Heights, Ill.

[73] Assignee: GTE Automatic Electric Laboratories Incorporated, Northlake, Ill.

[22] Filed: Apr. 26, 1973

[21] Appl. No.: 354,567

[52] U.S. Cl. .................... 179/84 VF
[51] Int. Cl. .................... H04m 1/50
[58] Field of Search ........... 307/235 R, 216, 247 R; 330/30 R, 124 R, 147; 179/84 VF

[56] References Cited

UNITED STATES PATENTS

| | | | |
|---|---|---|---|
| 3,582,565 | 6/1971 | Beeman et al. | 179/84 VF |
| 3,686,440 | 8/1972 | Kroeger | 179/5.5 |
| 3,780,230 | 12/1973 | Bowen et al. | 179/84 VF |

*Primary Examiner*—William C. Cooper
*Assistant Examiner*—Joseph A. Popek
*Attorney, Agent, or Firm*—Robert J. Black

[57] ABSTRACT

A circuit for detection of data signals as used in telephone switching systems. The circuitry detects the presence of actual data signals, while discriminating against voice signals that include frequency components that might be similar to data signals.

11 Claims, 1 Drawing Figure

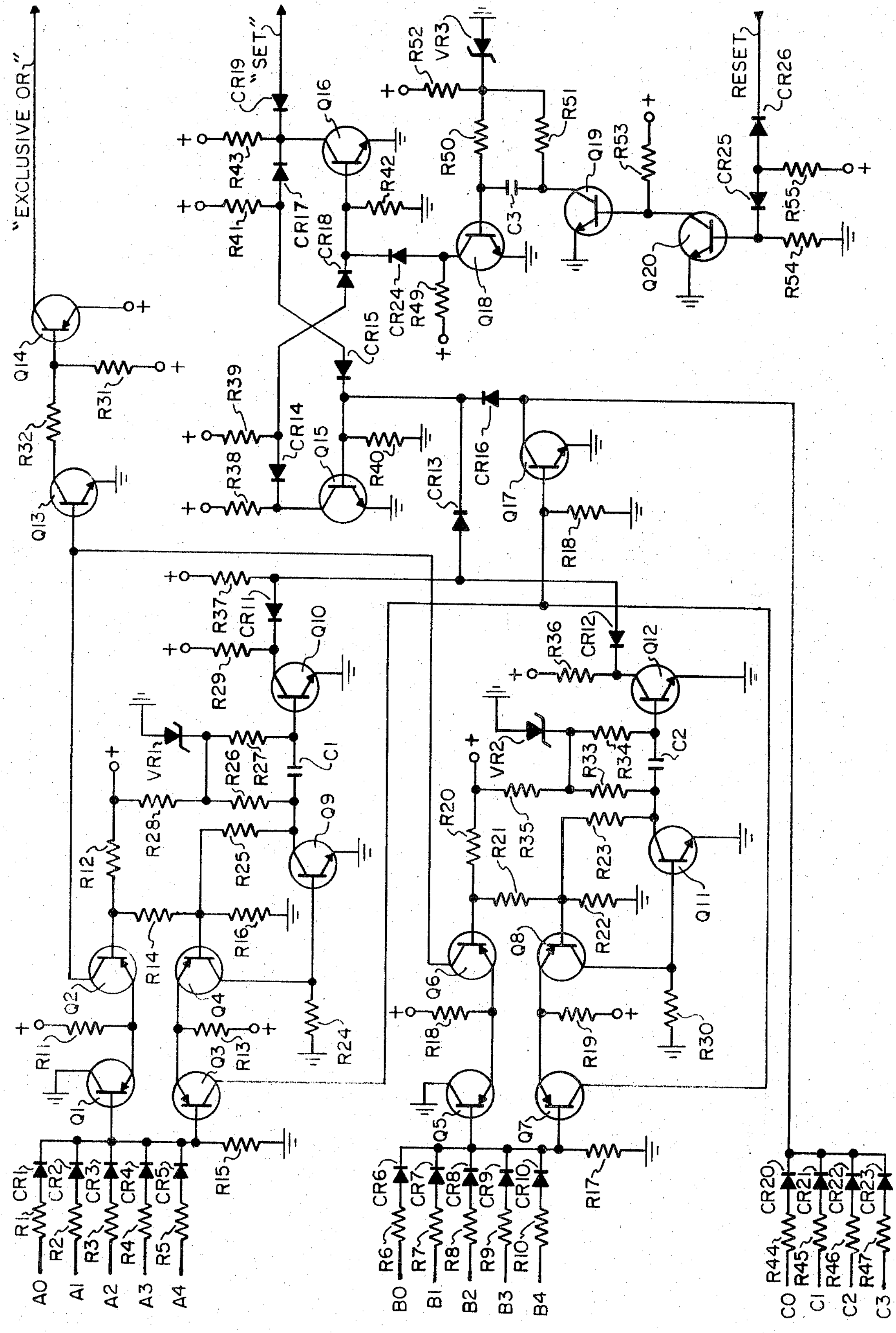
"EXCLUSIVE OR"
"SET"
RESET

DATA DETECTOR WITH VOICE SIGNAL DISCRIMINATION

BACKGROUND OF THE INVENTION

1. Field of the Invention

This invention relates to telecommunications and more particularly to the reception of data signals over a telecommunication system utilized for both voice and data signals. The present invention accepts properly constituted data signals, while rejecting voice signals, insuring registration of only valid data signals, thus insuring the integrity of the received data.

2. Description of the Prior Art

In the field of telephone switching system control extensive use has been made in recent years of pushbutton operated calling devices, rather than conventional dials. In most applications, the pushbutton calling device included in the subscriber's telephone subset, generates for each number selected, a pair of tone signals. One tone of each pair is included in a high group of frequencies and the other in a lower group of frequencies. In addition, additional tones may be generated for supervisory signaling.

At the central office to which the subscriber's subset is connected, a data receiver, decoder and register are provided. The registered information is then converted into operating signals for the telephone central office switching equipment to effect a desired subscriber connection. Because the detector operates in response to tone signals, a phenomena referred to as "talk-up" sometimes occurs. This phenomena occurs when a subscriber talks into the subset and some speech components are recognized as data. When this occurs the data receiver will cause registration of invalid information.

Various techniques have been employed to prevent the "talk-up" phenomena from occurring. These include the use of frequency isolation circuits such as filters, etc., amplitude detectors and timing circuitry.

In the present invention a new technique involving both measuring and timing of incoming signals overcomes many of the shortcomings of previous designs as well as providing substantial economy over devices that include either passive or active filler components.

SUMMARY OF THE INVENTION

In the present invention two checks are made to determine the validity of an incoming signal received by the data receiver. The first of these examines the status of the two principal bands of transmitted frequencies and if more than one frequency is present in either band, a signal is developed which is utilized to inhibit the associated data receiver from loading any incoming information, into an associated register.

The second test examines the high and low bands and compares in time the position of the high tone to the low tone or vice versa. In conventional telephone signaling systems employing calling device generated tones both high and low tones occur nearly simultaneously. In the present invention each tone generates a strobing pulse. As long as some overlap exists of the two strobe pulses a signal is developed which extends a set signal to the associated register so that it may receive the incoming data signals. If the high and low strobe signals do not overlap, the set signal is not generated. In this manner false incoming tones derived from voice will not be registered.

In addition the present invention provides for reception of supervisory tones. Since the supervisory tones occur along with the high and low signal tones both high and low signal tones must be present in combination with the supervisory signal. If these conditions are met, again the data receiver will be set permitting the incoming signals including the supervisory signal to be registered.

DESCRIPTION OF THE DRAWING

The single sheet of accompanying drawings is a schematic circuit diagram of a data detector that discriminates against voice signals in accordance with the present invention.

DESCRIPTION OF THE PREFERRED EMBODIMENT

Referring now to the accompanying drawing the circuitry of the present invention is connected to the high tone circuitry of an associated data receiver by means of the leads desinated A0, A1, A2, A3 and A4. The low group of tone circuits in the associated data receiver is connected to leads B0, B1, B2, B3 and B4. If supervisory tones are also to be detected appropriate connections are made from the data receiver at leads C0, C1, C2 and C3.

As noted previously the first function of the present circuit is to examine the status of the high and low bands of frequencies and to inhibit the data receiver from loading any information into an associated register if there is more than one frequency present in the high band (which shall be referred to as band A) or the low band (which shall be referred to as band B). If signals are present on any one of the leads A0 to A4 inclusive or B0 to B4 inclusive, a +20 volt potential is received from the associated data receiver. If no tone is present the output is 0 volts. These signals are then applied through the incoming resistors such as R1 to R10 inclusive and associated diodes CR1–CR10.

Inputs A0 to A4 are connected to ground through resistors R15 and also to the base of transistors Q1 and Q3. The base of transistor Q2 is connected to a voltage divider that extends from a source of positive potential through resistors R12, R14 and R16 with transistor Q2 connected between the junction of resistors R12 and R14. This provides a reference voltage to the base of transistor Q2 of 3.1 volts. If two or more tones in the A group are present on any of the leads A0 to A4 inclusive the current summing across resistors R15 will develop 4.4 volts or more at the base of transistor Q1 which is larger than the reference voltage of 3.1 volt which will turn transistor Q1 "off" and transistor Q2 "on." When transistor Q2 is turned "on," transistor Q3 is driven "on" and in turn drives transistor Q14 "on" to develop the "Exclusive OR" signal which is connected to the data receiver and acts to inhibit it from loading the associated register with improper data. Improper data in this instance is represented as more than a single tone in the A group.

The same operation occurs in the B band of tones whose outputs are wired through the leads designated B0 to B4 inclusive to the base of transistor Q5. In a manner similar to that described above if more than two incoming signals are summed across resistors R17, transistor Q5 will turn off turning transistor Q6 on since the developed potential at the base of transistor Q5 is greater than the reference value of 3.1 volts at the base of transistor Q6. The collector of transistor Q6 is OR'd with the collector of transistor Q2 at the base of transistor Q13, which in turn is used to drive transistor Q14. Obviously when two or more signals are present in the low band the Exclusive OR signal again will be developed for transmittal to the associated data receiver.

As noted previously the present circuit also examines the A and B bands and compares in time the position of an A or high tone to a B or low tone or vice versa. Each time aa single tone comes in on one of the leads A0 to A4 a potential of 2.5 volts is developed across resistor R15. This potential occurs at the base of transistor Q3. This amount is larger than the potential of 1.5 volts which exists at the base of transistor Q4 taken from the previously outlined voltage divider at the junction of resistors R14 and R16. Since 2.5 volts is larger than the 1.5 volts threshold, transistor Q3 will be turned off and transistor Q4 turned on. Transistor Q4 then drives transistor Q9 on. As transistor Q9 starts to turn on it supplies positive feedback through resistor R25 to the base of transistor Q4 which aids in turning transistor Q9 on harder. This technique provides a hysteresis effect which guarantees the saturation of transistor Q9.

When transistor Q9 saturates it removes base drive from transistor Q10 via capacitor C1. Transistor Q10 will turn off during the time it takes capacitor C1 to charge to about 0.6 volt. A 6 volt Zener supply including Zener diode VR1 is incorporated to guarantee that capacitor C1 will charge to only 6 volts. This technique prevents the base emitter junction of transistor Q10 from zenering in a reverse direction. In this manner through diode CR11, an "A strobe pulse" is developed.

In similar manner when a pulse occurs on one of the leads B0 to B4 inclusive a 2.5 volt potential is developed at the base of transistor Q7 turning it off and transistor Q8 will then turn on. When transistor Q8 turns on transistor Q11 will follow providing feedback in the manner described above through resistor R23, and after the charge time of the capacitor C2 which is similar to that of capacitor C1, transistor Q12 will turn off to apply a "B strobe pulse" through diode CR12. The outputs of transistors Q10 and Q12 respectively are connected through diodes CR11 and CR12 to the base of transistor Q15 through diode CR13.

Transistor Q15 with transistor Q16 diodes CR14, CR15, CR18 and CR19 and the associated biasing resistors form an enable flipflop circuit. The application of a strobe pulse (either A or B) by itself will not act to turn Q15 on since the absence of a pulse from either Q10 or Q12 will conduct the outgoing pulse from the pulse generating transistor to ground.

Assuming a pulse is present from both transistors Q10 and Q12, transistor Q15 of the aforementioned enable flipflop is turned on. Q16 will be turned off applying the set signal (through diode CR19) to the associated data receiver permitting it to load an associated data register. When the flipflop is reset, transistor Q16 would be on, which would prevent the data received from loading the registers. That is to say when both the A and B strobe pulses lap, transistor Q15 is driven on, which then sets the enable flipflop which allows the set data receiver to load the register. If the A and B strobes do not lap, the enable flipflop will not be set.

In dual tone multifrequency transmission systems both A and B tones occur nearly simultaneously, which would always set the enable flipflop. If speech does come through, the chance that an A tone will fall within 20 milliseconds of a B tone is quite low, which means the circuit would inhibit speech from being erroneously accepted by the data receiver.

Resetting of the enable flipflop occurs by means of of a delayed one-shot consisting of transistors Q18, Q19 and Q20 and the associated resistors, capacitors, etc. The associated data receiver sends out a signal over the reset lead shown. The leading edge of the signal turns transistor Q20 on, which in turn turns transistor Q19 off, which in turn allows capacitor C3 to charge to 6 volts. Transistor Q18 remains on. Again a 6 volt Zener diode VR3, is used to prevent the transistor Q18 base-emitter from zenering. When the reset signal trailing edge occurs transistor Q20 turns off, transistor Q19 turns on, in turn turning transistor Q18 off until capacitor C3 charges to 0.5 volts, generating a pulse for the charging duration of capacitor C3. This pulse drives transistor Q16 of the enable flipflop on, thus resetting the enable flipflop.

As noted previously in some instances supervisory or C tones are utilized in some signaling systems. Accordingly provisions for connection of such C tones are made via leads C0 to C3 inclusive to the present circuitry. As may be noted these leads are common and connected through diode CR16 to the base of transistor Q15. The collector emitter junction of transistor Q17 provides a shunt path to ground for the C signals. Accordingly if no A signal is present transistor Q3 is on, and as a result transistor Q17 will likewise be on and any signal received over the C leads will not reach the enable flipflop. Likewise if no signal is present in the B group transistor Q7 will be on maintaining transistor Q17 on again, providing a shunt path to ground. If, however, both A and B tones are present, transistors Q3 and Q7 will be off, and as a consequence transistor Q17 will also be off and the incoming C tone signals may be connected directly to the enable flipflop at the same time as the A and B strobe signals. No sequence check is made because it is highly unlikely that a concurrent combination of A, B and C tones will be present in speech to trigger the data receiver.

While but a single embodiment of the present invention has been shown it will be obvious to those skilled in the art that numerous modifications of the present invention can be made without departing from the spirit and scope of the present invention.

What is claimed is:

1. A data detector for use with a data receiver connected to a communication channel over which voice signals and tone signals are received, said data detector comprising: first gating means connected to said data receiver operated in response to concurrent receipt of a plurality of signals in a first band of frequencies; second gating means connected to said data receiver operated in response to concurrent receipt of a plurality of signals in a second band of frequencies; and signal generating means connected to said first and to said second gating means, including an output circuit connection to said data receiver, operated in response to either said first or second gating means to generate an output signal to inhibit operation of said data receiver.

2. A data detector as claimed in claim 1 wherein: said first and second gating means each comprise, a comparator circuit connected between said data receiver and a source of reference potential; said comparator circuit operated to generate an output to operate said signal generating means in response to the combined amplitude of concurrently received signals within a band of frequencies exceeding said reference potential.

3. A data detector as claimed in claim 1 wherein: said signal generating means comprises a transistorized switch, operated in response to either said first or second gating means, to connect a source of potential to said data receiver.

4. A data detector as claimed in claim 1 wherein there is further included: third gating means connected to said data receiver, operated in response to receipt of a tone signal in said first band of frequencies; fourth gating means connected to said data receiver operated in response to receipt of a tone signal in said second band of frequencies; and first switching means connected to said third gating means and to said fourth gating means, including an output circuit connection to said dating receiver, operated in response to concurrent operation of both said third and fourth gating means to enable the operation of said data receiver.

5. A data detector as claimed in claim 4 wherein: said third and fourth gating means each include a comparator circuit connected between said data receiver and a source of reference potential; said comparator circuit operated to generate an output to said first switching means in response to the amplitude of received tone signals within a band of frequencies exceeding said reference potential.

6. A data detector as claimed in claim 4 wherein: said first switching means comprise a bistable multivibrator set to a first stable state in response to the concurrent operation of said third and fourth gating means, to conduct a source of potential to said data receiver.

7. A data detector as claimed in claim 4 wherein there is further included: second switching means including input circuit connections from said third gating means and from said fourth gating means, said second switching means operated in response to concurrent operation of said third and fourth gating means; said first switching means further including input circuit connections from said data receiver; and said first switching means further operated in response to concurrent operation of said second switching means and receipt of a supervisory tone signal from said data receiver over said input circuit connections, to enable operation of said data receiver.

8. A data detector as claimed in claim 7 wherein: said second switching means comprise a transistor switch operated in response to said concurrent operation of said third and fourth gating means.

9. A data detector as claimed in claim 4 wherein there is further included: reset means connected between said data receiver and said first switching means, operated in response to a reset signal from said data receiver, to render said first switching means inoperative.

10. A data detector as claimed in claim 9, wherein: said first switching means comprise a bistable multivibrator set to a first stable state in response to the concurrent operation of said third and fourth gating means, to conduct a source of potential to said data receiver, and set to a second stable state in response to operation of said reset means to remove said source of potential from said data receiver.

11. A data detector as claimed in claim 10 wherein: said reset means comprise a monostable multivibrator, operated in response to a reset signal from said data receiver to transmit a pulse to said first switching means, whereby said first switching means are operated to said second stable state.

* * * * *